No. 719,997. PATENTED FEB. 10, 1903.
J. L. CLARK.
FLUE STOPPER.
APPLICATION FILED FEB. 27, 1902.
NO MODEL.
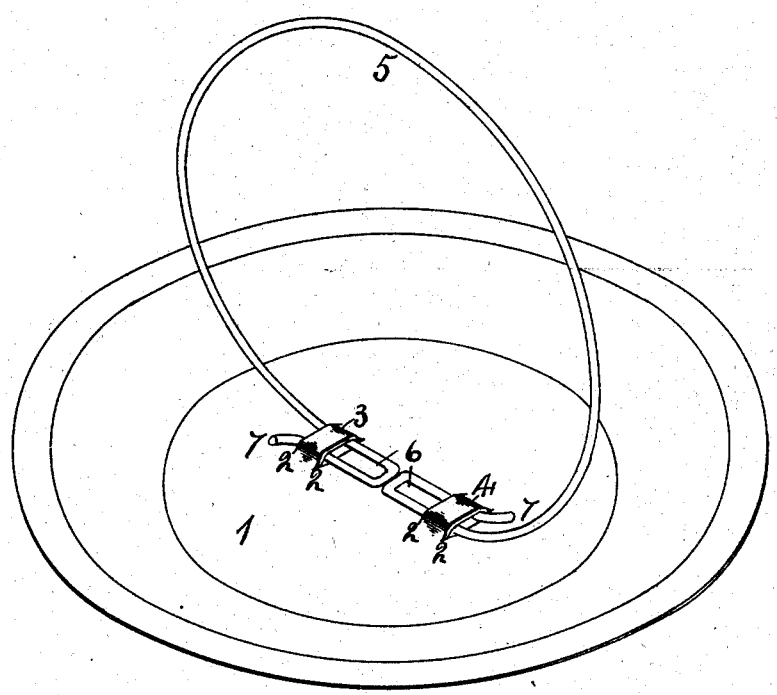
Witnesses:
E. Behel
Olin Behel
Inventor:
John L Clark
By A. O. Behel
Atty

UNITED STATES PATENT OFFICE.

JOHN L. CLARK, OF ROCKFORD, ILLINOIS.

FLUE-STOPPER.

SPECIFICATION forming part of Letters Patent No. 719,997, dated February 10, 1903.

Application filed February 27, 1902. Serial No. 96,015. (No model.)

*To all whom it may concern:*

Be it known that I, JOHN L. CLARK, a citizen of the United States, residing at Rockford, in the county of Winnebago and State of Illinois, have invented certain new and useful Improvements in Flue-Stoppers, of which the following is a specification.

The object of this invention is to construct a flue-stopper in which a bail is employed to hold the stopper in the flue, the bail having a detachable connection with the plate, and when in connection therewith it is held firmly.

In the accompanying drawing is shown an isometrical representation of my improved flue-stopper.

The plate 1 of the stopper is in disk form and has four slits 2, and the sections 3 and 4 of the plate between the slits are curved to form passage-ways. A bail 5 has its ends turned back, forming loops 6, and the short ends 7 of the loops are bent outward and lie in the same plane as the loops. These loops are slid in under the sections 3 and 4, thereby forming a connection between the bail and plate, and the loops under the sections hold the bail rigidly in proper position for use. The ends of the bail may be withdrawn from under the sections, which will permit the parts being closely packed for shipment. The bent ends 7 form stops and limit the distance the loops pass under the sections.

I claim as my invention—

A flue-stopper comprising a plate having a portion forming flat loops, a bail having its ends provided with return-bends extending in the lengthwise direction of the bail and adapted to pass under the loops, the ends of the return-bends turned outward forming stops whereby the bail is held rigidly in its connection with the plate.

JOHN L. CLARK.

Witnesses:
A. O. BEHEL,
E. BEHEL.